US009707422B2

(12) United States Patent
Elias et al.

(10) Patent No.: US 9,707,422 B2
(45) Date of Patent: Jul. 18, 2017

(54) TRANSPORT CONTAINER FLAME ARRESTOR

(71) Applicant: Worcester Polytechnic Institute, Worcester, MA (US)

(72) Inventors: Brian E. Elias, North Stonington, CT (US); Robert G. Zalosh, Wellesely, MA (US); Ali S. Rangwala, East Lyme, CT (US)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 14/638,229

(22) Filed: Mar. 4, 2015

(65) Prior Publication Data

US 2015/0251030 A1 Sep. 10, 2015

Related U.S. Application Data

(60) Provisional application No. 61/948,162, filed on Mar. 5, 2014.

(51) Int. Cl.

| | |
|---|---|
| ***A62C 3/07*** | (2006.01) |
| ***A62C 3/06*** | (2006.01) |
| ***A62C 2/06*** | (2006.01) |
| ***B60K 15/04*** | (2006.01) |
| ***A62C 4/00*** | (2006.01) |

(52) U.S. Cl.
CPC ................ *A62C 3/065* (2013.01); *A62C 4/00* (2013.01)

(58) Field of Classification Search
CPC ................................................ F17C 2260/042
USPC ........... 220/88.2, 562, 563, 564, 567.2, 86.2
See application file for complete search history.

(56) References Cited

U.S. PATENT DOCUMENTS

| | | | | | |
|---|---|---|---|---|---|
| 651,353 | A * | 6/1900 | Henze | A62C 4/00 220/88.2 |
| 695,237 | A * | 3/1902 | Scheuffgen | A62C 4/00 220/88.2 |
| 3,811,605 | A | 5/1974 | Flider | |
| 4,273,265 | A | 6/1981 | Anderson | |
| 4,489,860 | A | 12/1984 | Flider | |
| 2013/0320009 | A1 | 12/2013 | Cray | |

(Continued)

OTHER PUBLICATIONS

PCT International Search Report, 2 Pages, Jul. 30, 2015.

*Primary Examiner* — J. Gregory Pickett
*Assistant Examiner* — Allan Stevens
(74) *Attorney, Agent, or Firm* — Chapin Intellectual Property Law, LLC

(57) ABSTRACT

A volatile liquid storage container has combustion resistance properties from a flexible sock or tube constructed of fire resistant fibers coupled to a neck of the storage container to prevent flame flash-back into the storage container. The storage container defines an enclosed volume having an orifice in the container material leading to a neck for pouring and filling the enclosed volume for exchanging the contents therein. The tube is elongated and surrounds a circumference of the orifice for engaging any ignition source entering through the orifice. The flexible nature of the tube or sock allows it to extend to an opposed interior surface of the enclosed volume, and ensures that the tube or sock is immersed in the fluid for encircling any ignition path to the volatile liquid without interfering with an ability to pour or refill the container.

11 Claims, 4 Drawing Sheets

(56) References Cited

U.S. PATENT DOCUMENTS

| | | | | |
|---|---|---|---|---|
| 2015/0068778 | A1* | 3/2015 | Riordan | A62C 3/065 169/66 |
| 2016/0153678 | A1* | 6/2016 | Papas | A62C 4/02 62/331 |

* cited by examiner

TRANSPORT CONTAINER FLAME ARRESTOR

RELATED APPLICATIONS

This application claims the benefit under 35 U.S.C. §119 (e) of U.S. Provisional Patent Application No. 61/948,162 filed Mar. 5, 2014, entitled "FLUID CONTAINER FOR VOLATILE MATERIALS" incorporated herein by reference in entirety.

BACKGROUND

Portable gasoline containers provide readily available quantities of gasoline for small volume needs such as portable power equipment for home and light industrial use. Such containers, nonetheless, dispose volatile liquids in a variety of environments where handling of the containers lends them vulnerable to spillage, puncture, or simply vapor communication with external ignition sources due to loose or missing filler caps.

In the United States, for example, more than 20 million portable gasoline containers (PGC's) are sold annually, with over 46% of U.S. households having at least one. As early as 1973, consumer research organizations demonstrated the potential for a PGC to explode as a result of flame propagation through the pour spout. This same hazard still exists today for consumer gasoline cans, as has been evidenced by continuing reports to the Consumer Product Safety Commission (CPSC), and also as highlighted in recent media reports by various agencies. In addition to the health and safety hazard, these incidents also represent a significant potential liability for gasoline container manufacturers. In 2011 a major gasoline container manufacturer filed for bankruptcy as a direct result of lawsuit settlements from gasoline explosion incidents. Consumer oriented advisory and regulatory groups such as the CPSC or Underwriters Laboratory (UL) may have an interest in improved approaches to PGS safety.

SUMMARY

A volatile liquid storage container has combustion resistance properties from a flexible sock or tube constructed of fire resistant fibers coupled to a filling orifice or neck of the storage container to prevent flame flash-back into the storage container, such as a portable gasoline container (PGC). The storage container defines an enclosed volume having an orifice in the container material for pouring and filling the enclosed volume for exchanging the contents therein. The sock or tube is elongated and surrounds a circumference of the orifice for engaging any ignition source entering through the orifice. The flexible nature of the tube or sock allows it to extend into the enclosed volume, and ensures that the tube or sock is encircling any ignition path to the volatile liquid without interfering with an ability to pour or refill the container. The tube or sock therefore employs a mesh or porous surface for permitting fluidic passage to the neck while providing an ignition-arresting structure to prevent flame flash-back into the PGC, and which does not hinder the filling and emptying of gasoline from the PGC.

Configurations herein are based, in part, on the observation that conventional approaches to PGC flame arrestors often employ bulky and/or complicated modifications to a basic vessel for reducing a vapor space above the liquid, or interfere with fluid ingress and egress, thus making the containers cumbersome to pour and refill. Such mechanical manipulations often add to the weight and cost of the containers, as well. Conventional approaches to volatile liquid containment suffer from the shortcoming that flame arrestors are often ineffective, interfere with fluid flow, and/or too expensive for home usage. Accordingly, configurations herein substantially overcome the above-described shortcomings by providing a tubular formation of a continuous, elongated sheet or planar material for sealing engagement with a pouring/fill orifice of the volatile liquid container, such as a PGC (container).

Conventional approaches to PGC design and development suffer from several shortcomings:

i. Cost: Existing in-line flame arrestors tend to be designed for industrial applications such as the protection of large storage vessels and pipelines; accordingly the devices are typically large and expensive.

ii. Liquid flow: Existing in-line flame arrestors are typically designed for gas or gas-vapor applications, rather than the liquid flow required for a PGC. This results in a high resistance to flow—both for in-flow (container filling) and out-flow (container pouring). Additionally, this type of design is susceptible to fouling from suspended solids in the gasoline.

iii. Void-reducing products: Void-reducing products, such as a bladder, inserted into the container headspace above the liquid add additional weight and reduce the usable fuel volume. These products also lead to fuel retention or coating of the headspace material which may make it difficult for a consumer to completely remove gasoline from the container.

A flame arrestor device as disclosed herein includes an enclosed fluidic storage vessel, such as a molded plastic gasoline container having an interior volume defined by an enclosure adapted to contain a stored fluid, and an orifice through the enclosure for communication with the stored fluid. A lid, pour spout, sealing cap, or similar combination is often installed at the orifice to enable normal dispensing and refilling. A continuous, elongated permeable medium is installed in a sealing engagement to the orifice for directing fluids passing through the orifice to the permeable medium for passage there through, such that any fluid ingress or egress must pass through the permeable medium, which therefore provides a flame arresting barrier.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations depicted herein provide a volatile fluid container such as a PGC for containment and dispensing of volatile liquids such as gasoline, which is less bulky and cumbersome than conventional approaches, making the disclosed approach ideal for home and consumer use, such as lawn and garden power equipment. Hazards and resulting accidents from volatile liquids typically result not from the liquid itself, but from a volume of vapor that accumulates above the volatile liquid, and which can become concentrated in an enclosed area such as the void above the liquid in a containment vessel.

Flame arrestors, as are known in the art, operate to prevent passage of a flame, thus preventing the explosive combustion of gases. Flame arrestors operate to quench a traveling flame by absorbing the heat that propagates the flame. For example, conventional flame arrestors on a small gasoline engine may take the form of a metal screen around an enlarged muffler egress for exhausting combusted gases. The exhaust flow may still have an active flame, based on the combustion speed and timing of the engine. The metal screen absorbs heat from the flame, while permitting hot gases to pass through the screen.

A typical PGC employed with configurations herein is a molded plastic containment vessel defining an interior volume for fluid containment. A metal construction of a flame arrestor is undesirable because the differing conductivity of the metal and the plastic increases the risk of a static electrical discharge resulting in a spark. Conventional approaches take the form of a convex surface or pipe extending from a filler neck into the containment area. However, such approaches tend to impede filling and dispensing by physically blocking the fuel flow.

A flame arrestor as defined herein includes an elongated tubular formation of a sheet or planar material or medium adhering a continuous, elongated permeable medium in a sealing engagement to a filling orifice or filler neck for directing fluids passing through the orifice to the permeable medium for passage therethrough, such that the permeable medium is adapted to quench a flame from passage through the medium. The elongated medium appears as a "sock" or tubular, hollow structure sealed at the neck and terminating in a concave, sealed or fused end such that all fluid ingress or egress to or from the can and passing through the orifice must also pass through the permeable medium, thus providing a continuous barrier between an ambient exterior and the interior volume defined by the container enclosure and adapted to contain the stored fluid and any vapors emitted. An ignition source reaching the interior volume would have any resulting flame stopped, or quenched, at the permeable medium, thus preventing an explosive ignition and expansion of gases outside the container.

Figure 1:
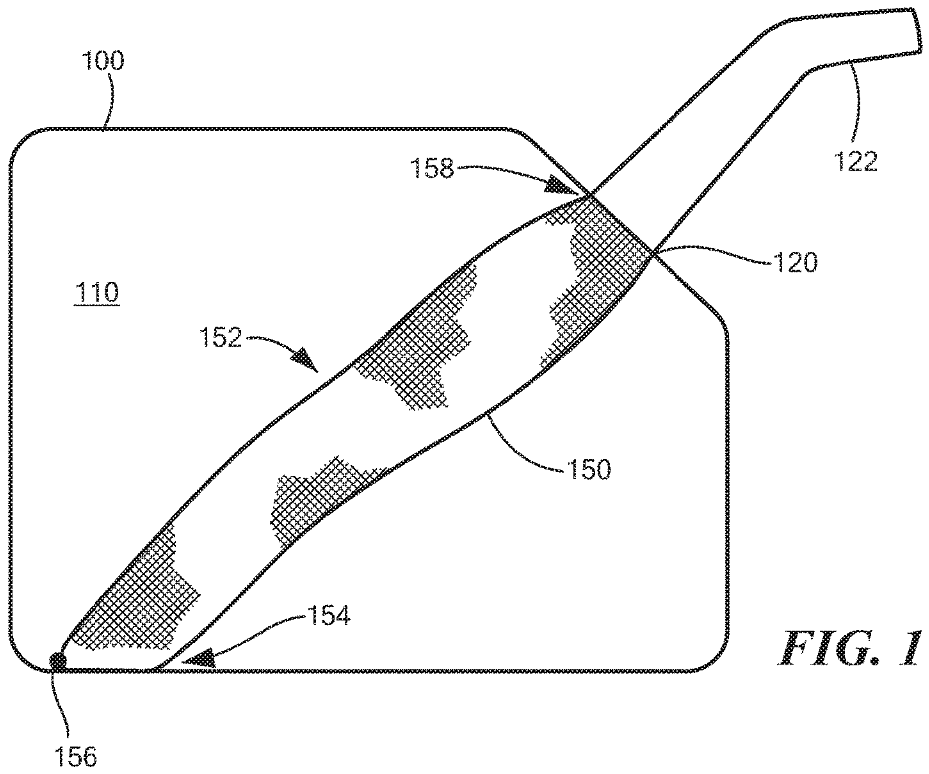
FIG. 1 is a side cutaway view of a container suitable for use with configurations herein.

FIG. 1 is a side cutaway view of a container suitable for use with configurations herein. Referring to FIG. 1, a storage vessel 100 defines an interior volume 110 for storage of volatile fluids such as gasoline, kerosene and the like. An orifice 120 leads to a neck 122 or other pouring or coupling mechanism for dispensing or emptying fluids from the interior volume 110. A permeable medium 150 having a tubular or similar shape extends from sealing engagement with the orifice 120 and any neck 122 or other appurtenant dispensary apparatus through the interior volume 110. The permeable medium 150 is adapted to quench a flame from passage through the medium 150, and defines a network of perforations, sufficiently small to quench a flame from passage to the interior volume 110, discussed further below.

In the example arrangement shown, the permeable medium 150 takes a closed end tubular shape forming a sealable engagement with the orifice 120, in which the tubular shape 152 includes a distal end 154 having a closure 156 and a proximate end 158 sealing around the orifice 120 for directing the fluid through the permeable medium 150. The tubular shape 152 may be attached via an attachment 160 to the interior volume at the closed distal end 154, such that the attachment 160 maintains the permeable medium 150 in an elongated shape for preventing compression of the permeable medium 150 from impeding fluid flow. An unattached tubular shape 152 might respond to tilting or inverted orientations of the storage vessel 100, such as when filling an equipment fuel tank, and cause the permeable medium 150 to deform in response to gravity and compress or "bunch up" in response to gravity and impede fluid flow at the orifice 120.

Figure 2:
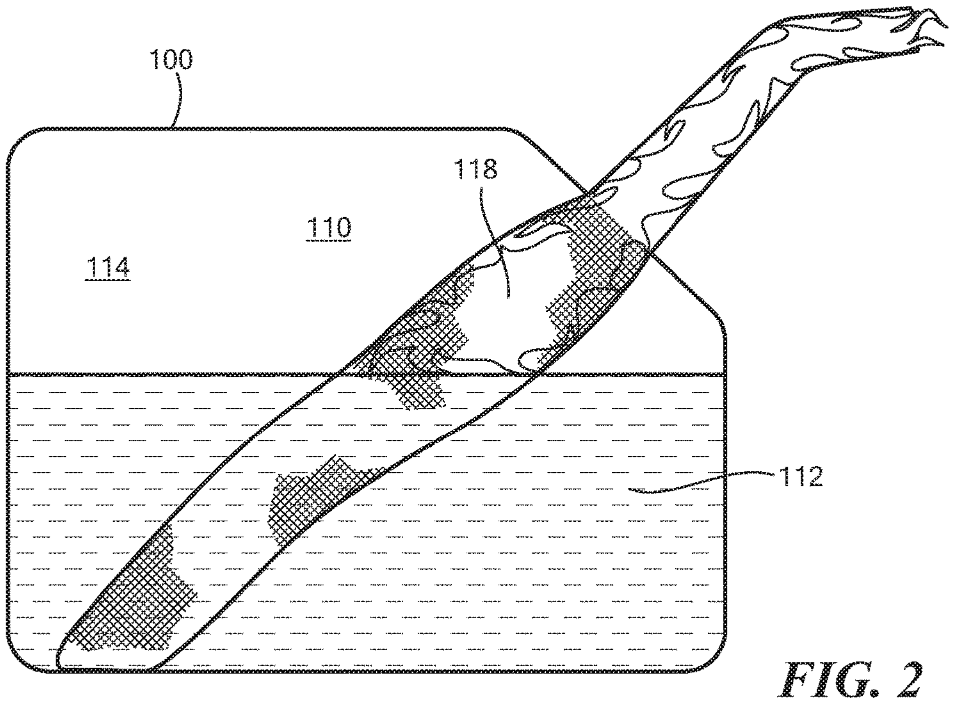
FIG. 2 is a functional schematic depicting the flame arrestor as disclosed herein.

FIG. 2 is a functional schematic depicting the flame arrestor as disclosed herein. Referring to FIGS. 1 and 2, in the storage vessel 100, the interior volume 110 is occupied by the stored fluid 112, such as gasoline, which settles in the bottom of the interior volume 110, and a vapor 114, typically a mix of vapors from the stored fluid 112 and ambient air. A mix of oxygen from the ambient air and the fluid vapors results in a volatile gas region occupying the upper region of the interior volume 110. If vented vapors outside the container 100 reach an ignition source, such as a spark, flame travels along the vapors and up through the neck 122 and into an interior 118 of the permeable medium 150. In a typical hazardous scenario the flame is ignited near the open end of the spout and propagates into the spout and the interior of the flame arrestor. Since the flame cannot propagate through the flame arrestor to the flammable vapor-air mixture above the gasoline surface, there is no explosion in the PGC. The tubular shape 152 allows flame to briefly propagate above the fluid 112 and within the permeable medium 150. Flame does not travel beyond the permeable medium 150 due to the permeability and arrangement or orifices or openings in the permeable medium 150, therefore the vapor 114 does not ignite and/or explode.

Figure 3:
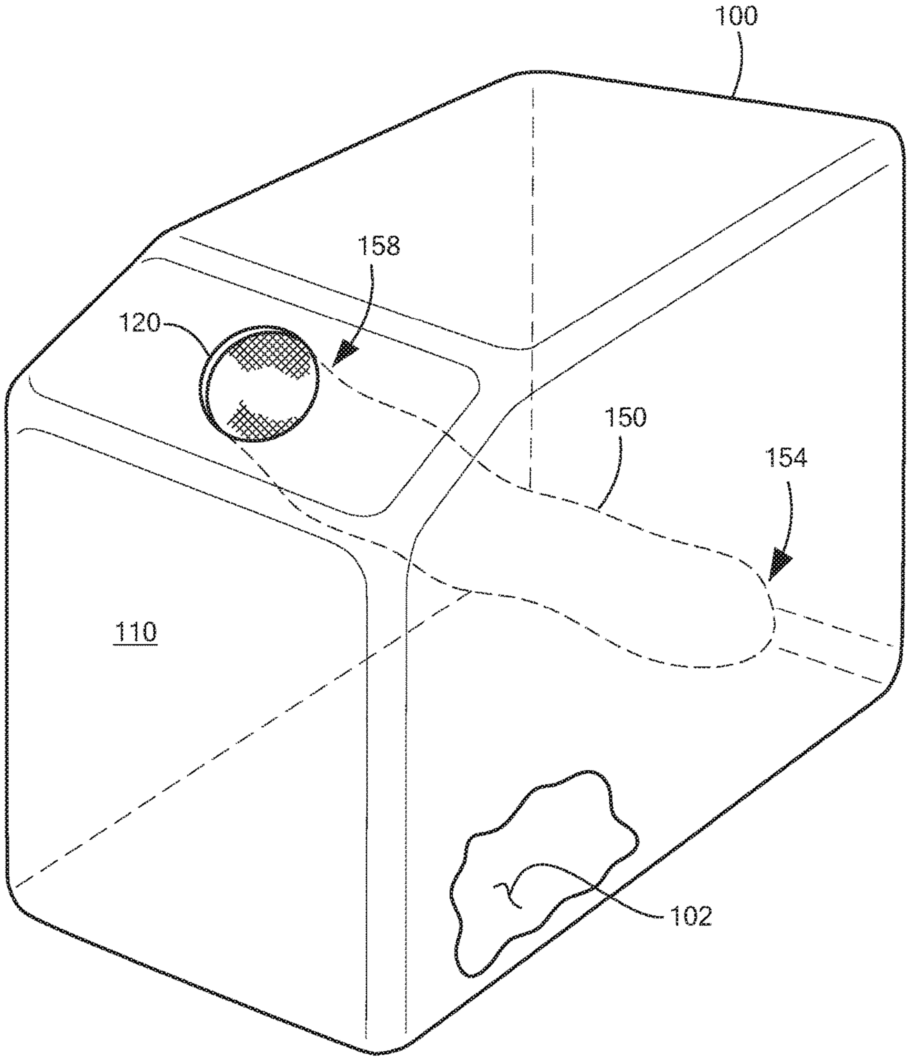
FIG. 3 depicts a perspective view of the storage container as disclosed herein.

FIG. 3 depicts a perspective view of the storage container as disclosed herein. Referring to FIGS. 1-3, the permeable medium 150 joins with the orifice 120 in a permanent or removable manner and extends towards the bottom surface 102 of the container storage vessel 100. The nexk 122 may also be unitary or detachable with the permeable medium 150 at the orifice 120, to allow for continuous construction of the permeable medium with the storage vessel 100, or to allow the permeable medium 150 to be installed as an accessory to an existing container. The permeable medium 150 is formed from a planar material such as a sheet of deformable, fibrous textile or polymer material or mesh into the elongated tubular shape 152 that engages the orifice 120 at the proximate end 158 and closed at the distal end 154 for directing the fluid 112 passing through the orifice through the permeable medium 150. The engaged orifice 120 and closed end are configured for directing all fluid passing through the orifice 120 through the continuous sheet formed by the permeable medium 150, such that a molded or gasketed seal at the orifice ensures that there are no gaps or open regions through which flame might propagate. The continuous nature of the permeable medium likewise ensures that there are no gaps or voids through which vapor or liquid may pass except for the permeations in the permeable medium 150. The engagement of the permeable medium 150 at the orifice 120 therefore provides a sole point of ingress or egress from the interior volume, for ensuring that the only fluid ingress or egress, and thus any flame propagation path, is through the permeable medium 150. Note below, however, the discussion below of a separate vent to relieve pressure difference as fluid is poured.

Figure 4A:
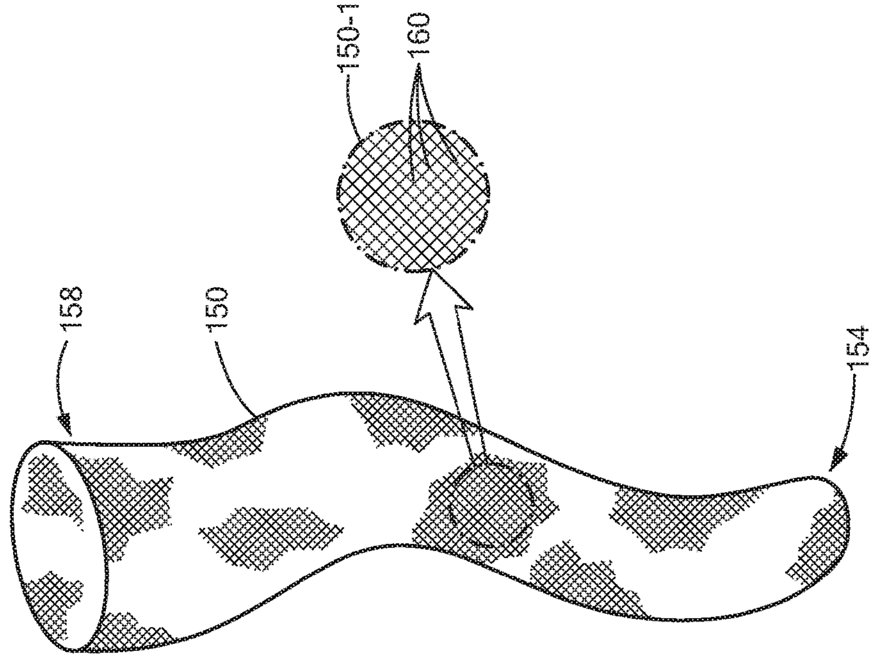
FIGS. 4A and 4B shows the flame arrestor medium of FIG. 3.
Figure 4B:
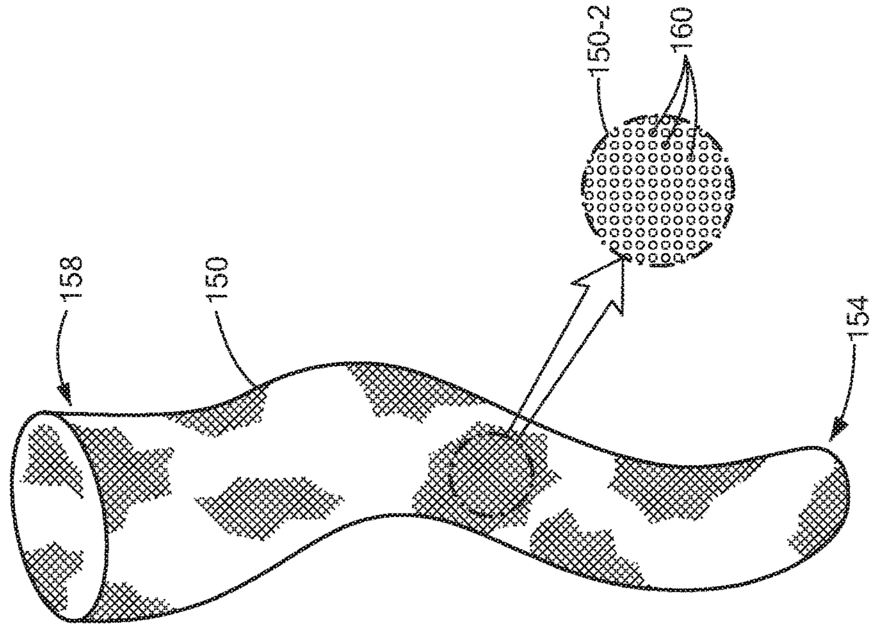

FIGS. 4A and 4B shows the flame arrestor medium of FIG. 3. The permeable medium 150 is a flame arrestor medium adapted to quench passage of a flame to prevent sudden ignition of the vapors 114 in the interior volume 110. In the example configuration, the permeable medium 150 is a flexible mesh 150-1 having perforations 160 sufficiently small to prevent passage of a flame, while also having a permeability for allowing fluid ingress and egress through the orifice 154. The length of the elongated permeable medium 150 is selected to have sufficient perforations to permit unimpeded fluid flow through the orifice 120. In other words, the collective fluid volume permitted to pass through all the perforations 160 is sufficient to allow pouring of the gasoline into a gas tank, and sufficient to prevent overflow or "backsplash" when refilling from a station pump. Conventional approaches do not employ sufficiently large or a sufficient number of passages to permit workable fluid flow without overflow or excessive inversion (i.e. turning the container "upside down") to effect a fluid flow.

The permeable medium 150 may also take the form of a sheet-like or planar material 150-2 having perforations 160 formed, rather than as spaces between fibers of a mesh construction as in 150-1. Any suitable arrangement for providing a perforation 160 size sufficient to quench flame, and sufficient in number such that the aggregate flow rate through the plurality of perforations allows for filling or emptying the container, may be provided. In an example arrangement, the perforations 160 may be between 0.1 mm and 0.2 mm, however other arrangements may provide a minimum quenching distance, or perforation size/diameter, sufficient to prevent flame passage.

In an example arrangement, the permeable medium comprises a flexible material such as "NOMEX®" which is formed into the shape of a sock or tube and attached at the neck of the container and also at the base or at the wall of the storage vessel 100 (container). Attachment at the neck or orifice 120 provides that the arrestor cannot be removed during proper usage, and the attachment 156 at the base (bottom surface 102) will ensure that the arrestor does not influence pouring or filling. The distal end 154 may terminate in a convex, spherical shape, or may be tied, molded or fused to terminate the tubular shape 152. Such fusing or tying may also be part of the attachment 156 for ensuring that the tubular shape 152 extends to the bottom surface 102 or opposed side of the storage vessel 100. Thus, the permeable medium 150 defines a deformable sock of flexible material, such that the flexible material has porosity sufficient to quench a flame from reaching or passing to the interior volume 110 and sufficient to allow fluidic ingress and egress to and from the interior volume 110

The fabric (NOMEX®) is resilient to wear and tear. Further, the length ensures easy pour and fill operation. The gap defining the perforations 160 between fibers is smaller than the minimum explosive safe gap (MESG) necessary for gasoline vapor flame mitigation. If necessary, additional layers of fabric may be added to provide additional flame quenching and to improve frictional wear and tear. Other fibers, besides NOMEX®, that can be used to make the flexible flame arrestor are ceramic fibers (such as FIBERFRAX®), glass micro fibers (such as MICRO-STRAND™), and carbon fibers (such as carbon PAN fibers and carbon nanofibers). Most of these materials are commercially available as nonwoven mats. All these materials are either noncombustible or are resistant to the short duration flames that could propagate into the PGC. The permeable medium 150 is therefore a continuous sheet material affixed around a circumference of the orifice for directing dispensed fluid through the continuous sheet of mesh, woven, planar and/or layered construction, and may also be rigid for ensuring that sufficient surface area remains unobstructed for passage of the ingress or egress fluid.

Figure 5:
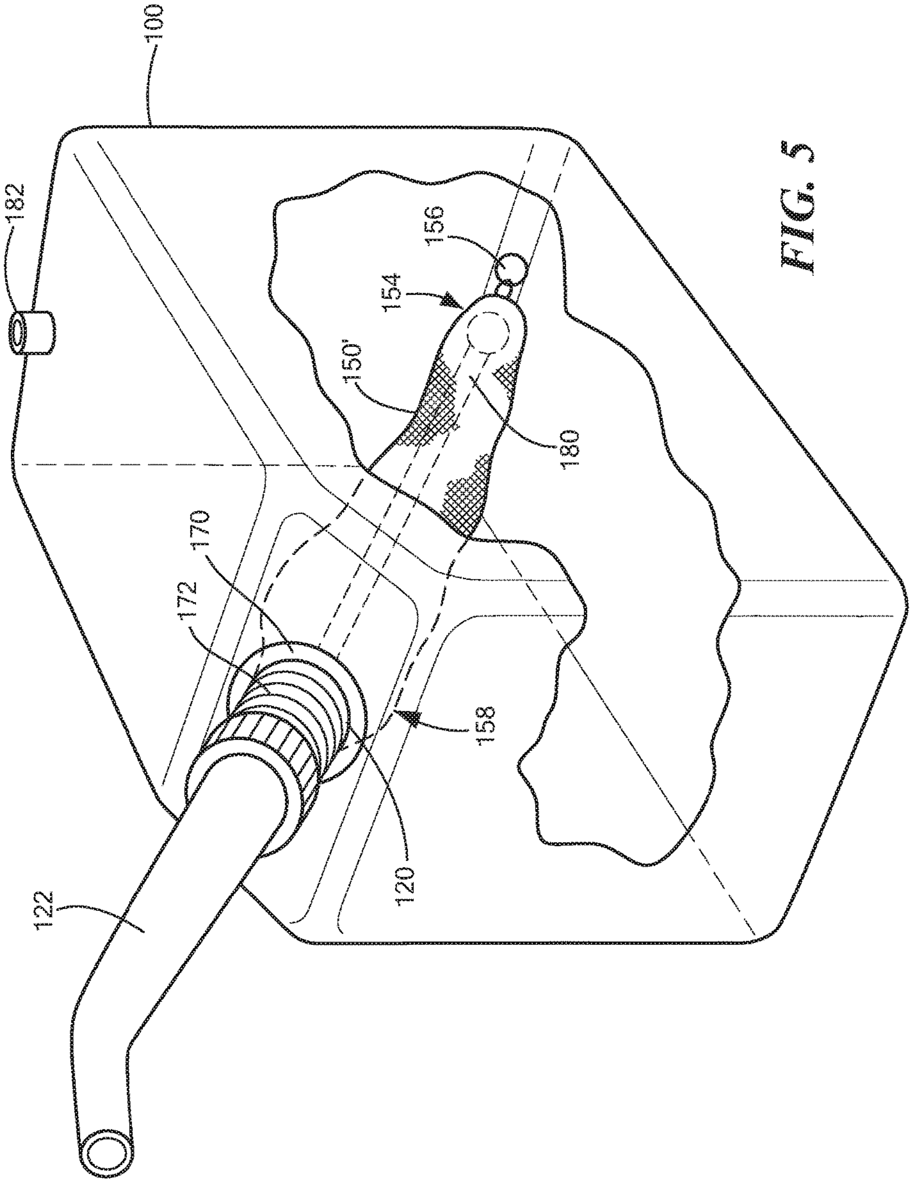
FIG. 5 shows an alternate configuration of the storage container of FIG. 3.

FIG. 5 shows an alternate configuration of the storage container of FIG. 3. Referring to FIGS. 1, 2 and 5, the orifice 120 may further comprise a removable rim 170 surrounding the orifice 120, such that the removable rim 170 defines the continuous engagement of the permeable medium 150 or other perforated material to the orifice 120, in which the perforated material has a perforation density sufficient to prevent flame passage while allowing controlled fluidic flow through the orifice 120. This arrangement may operate as an accessory or attachment to a conventional tank design, and may attach via threads 172 around the orifice 120 in conjunction with the neck 122.

Such construction forms a fluid containment to define the interior volume 110 by defining the orifice 120 through the enclosure (storage vessel 100) for communication with the stored fluid 112 for ingress and egress of the stored fluid 112 with the interior volume 110. The permeable medium 150 is attached to the removable rim 170 adapted for selective detachment from the orifice 120, such that the engaged rim 170 provides a sealing engagement with the orifice 120 for directing the fluidic flow to ensure that all fluid flow is through the permeable medium. The perforated material attaches to the rim 170 for providing a continuous surface separating the interior volume 110 at the orifice 120.

The permeable medium 150 may take a variety of forms, such as a graduated diameter tube 150' that increases in size toward the orifice 120, to provide a larger "base" in an inverted container and ensure that the tubular shape 152 does not collapse and interfere with fluid flow when inverted, such as when turned upside down by a user to empty into a fuel tank. The attachment 156 may also be employed to maintain the tubular shape 152 of the permeable medium 150, and may be a molded or attached tether for connecting the distal end 154 to the bottom surface 102. A rigid shaft or wire 180 may also be inserted into the permeable medium 150 and attached at the distal end 154 for maintaining the tubular shape 152.

A fuel vent 182 may be provided, to prevent a vacuum build up as fluid is poured which can result in "sloshing" or splashing of fuel due to a sudden burst of air to satisfy the vacuum. Such a fuel vent 182 may be fitted with a similar permeable material 150, or may simply be locked closed when maintaining the flame arrestor properties of the storage vessel 100.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. An enclosed fluidic storage vessel, comprising:

an interior volume defined by an enclosure adapted to contain a stored fluid;

an orifice through the enclosure for communication with the stored fluid;

a continuous, elongated permeable medium in a sealing engagement to the orifice for directing fluids passing through the orifice to the permeable medium for passage therethrough, the permeable medium defining a deformable sock of flexible material, the flexible material having porosity sufficient to quench a flame from passage through the permeable medium and sufficient to allow fluidic ingress and egress through the permeable medium, the permeable medium defined by a continuous sheet material affixed around a circumference of the orifice for directing dispensed fluid through the continuous sheet, and the sock attached to a side of the enclosure at a closed end of the sock by an attachment, the attachment maintaining the permeable medium in an elongated shape for preventing compression of the permeable medium from impeding fluid flow, the elongated shape supported at a proximate end by a sealing engagement at the orifice and by a fused closure at a distal end, wherein the attachment tethers the fused end of the elongated shape to the side of the enclosure.

2. The storage vessel of claim 1 wherein the permeable medium defines a network of perforations, the perforations sufficiently small to quench a flame from passage through the permeable medium.

3. The storage vessel of claim 2 wherein the continuous, elongated permeable medium is a closed end tubular shape forming the sealing engagement with the orifice, the tubular shape including a distal end having a closure and a proximate end sealing around the orifice for directing the fluid through the permeable medium.

4. The storage vessel of claim 1 wherein the permeable medium is a flexible mesh having perforations sufficiently small to prevent passage of a flame, the flexible mesh having a permeability for allowing fluid ingress and egress therethrough, a length of the elongated permeable medium having sufficient perforations to permit unimpeded fluid flow therethrough.

5. The storage vessel of claim 1 wherein the permeable medium is formed from a planar material into an elongated tubular shape engaging the orifice at a proximate end and closed at a distal end for directing fluid passing through the orifice through the permeable medium.

6. The storage vessel of claim 5 wherein the orifice and closed end are configured for directing all fluid passing through the orifice through the continuous sheet.

7. The storage vessel of claim 6 wherein the orifice provides a sole point of ingress or egress from the interior volume.

8. The storage vessel of claim 5 further comprising a removable rim surrounding the orifice, the removable rim defining a continuous engagement of a perforated material defining the permeable medium to the orifice, the perforated material having a perforation density sufficient to prevent flame passage while allowing controlled fluidic flow therethrough.

9. The storage vessel of claim 1 wherein the porosity is based on a gap defining perforations between fibers and is smaller than a minimum explosive safe gap (MESG) for gasoline vapor flame mitigation.

10. The storage vessel of claim 9 wherein the perforations are between 0.1 mm and 0.2 mm.

11. The storage vessel of claim 9 wherein the permeable medium is a deformable mesh fabric.

* * * * *